United States Patent
Hardjono et al.

(10) Patent No.: US 6,813,714 B1
(45) Date of Patent: Nov. 2, 2004

(54) MULTICAST CONFERENCE SECURITY ARCHITECTURE

(75) Inventors: Thomas P. Hardjono, Arlington, MA (US); Brad Cain, Cambridge, MA (US); Naganand Doraswamy, Arlington, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/375,594

(22) Filed: Aug. 17, 1999

(51) Int. Cl.[7] .............. H04L 9/00; G06F 11/30; G06F 12/14
(52) U.S. Cl. ............ 713/201; 713/200; 713/201; 713/150; 713/163; 380/277; 380/278
(58) Field of Search ................ 713/200, 201, 713/150, 151, 152, 155; 380/277, 278

(56) References Cited

U.S. PATENT DOCUMENTS

| | | | |
|---|---|---|---|
| 5,935,245 A | * 8/1999 | Sherer | ............ 713/200 |
| 5,940,591 A | * 8/1999 | Boyle et al. | ............ 713/201 |
| 6,002,768 A | * 12/1999 | Albanese et al. | ............ 713/175 |
| 6,049,878 A | * 4/2000 | Caronni et al. | ............ 713/201 |
| 6,195,751 B1 | * 2/2001 | Caronni et al. | ............ 713/163 |

OTHER PUBLICATIONS

Thomas Hardjono, Naganand Doraswamy & Brad Cain, An Architecure for Conference–Support Secured Multicast, 1997, Fourteen (14) pages, Chapman & Hall.

* cited by examiner

Primary Examiner—Justin T. Darrow
Assistant Examiner—A. Nobahar
(74) Attorney, Agent, or Firm—Blakely Sokoloff Taylor & Zafman (57) ABSTRACT

The present invention is a method and apparatus for securing a session in a system having application and network layers. The session is managed by a session manager. Security components used in the session are provided by a security storage. The session manager coordinates a mapping of a conference session at the application layer to a multicast session at the network layer using the security components provided by the security storage.

88 Claims, 7 Drawing Sheets

FIG. 6

MULTICAST CONFERENCE SECURITY ARCHITECTURE

BACKGROUND

1. Field of the Invention

This invention relates to computer networks. In particular, the invention relates to conference security.

2. Description of Related Art

Group-oriented security is typically directed to either the application layer or the network layer. Approaches for the application layer employ user authentication techniques either separately or integrated into a conference key distribution scheme. Approaches for the network layer achieve group security through the distribution and management of cryptographic keys using techniques collectively referred to as group key management (GKM).

Although these approaches provide some level of security for group-oriented activities, they are inadequate for multicast or conferences that require a high level of security and flexibility in conference management. Examples of these desired features include source identity and authentication, data confidentiality, participation non-repudiation, sender/receiver non-repudiation, cheater detection and identification, secure conference joining, and secure member ejection.

Therefore there is a need in the technology to provide a simple and efficient method to provide secure group activity in a network environment.

SUMMARY

The present invention is directed to a method and apparatus for securing a session in a system having application and network layers. A multicast conference secure architecture (MCSA) acts as an intermediary at the session layer between an application layer and a network layer. By providing an intermediary at the session layer, many protocols and applications at the application and network layers can be maintained separately and independently. The MCSA includes a session manager and a security storage. The session is managed by a session manager. Security components used in the session are provided by a security storage.

According to one embodiment of the present invention, the session manager includes a conference session manager interfacing to the application layer and a multicast session manager interfacing to the network layer. The security storage includes storages of the conference keys, the group keys, the session directory, and a security association database. A session is initiated by an initiator session manager. An authorizer is appointed to manage the distribution of the group key to be used in the encryption and decryption of the messages transferred during the session. Conference keys are generated and distributed to users in the session when the users become the members of the session.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DESCRIPTION

The present invention is a method and apparatus for securing a multicast/conference session in a network. The technique provides a multicast conference secure architecture (MCSA) at the session layer between the application layer and the network layer. The MCSA includes (i) a session manager to manage a session and (ii) a security storage to store the security components to be used in the session. The technique provides a mechanism to act as an intermediary between the application and the network layers so that protocols and management programs at these two layers can be used without substantial modifications.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

In particular, in the following discussion, certain terminology is defined in the following. A "conference" is generally defined as an N-to-N communication occurring at the application layer, or originated from events at the application layer. A "multicast" or "Internet Protocol (IP) multicast" is generally defined as an N-to-N communications occurring at the network layer. A "session" (used alone) is generally defined as a group activity supported by the conference and the multicast. The term "multicast session" includes all multicast groups related to a session. For example, a session may have an audio group and a video group and both are considered together when dealing with security. A "conference key" is used at the conference level (at the application layer). A "group key" is used at the multicast level (at the network layer). The key is used to encrypt or encipher the traffic among the parties involved at the appropriate level.

Figure 1A:
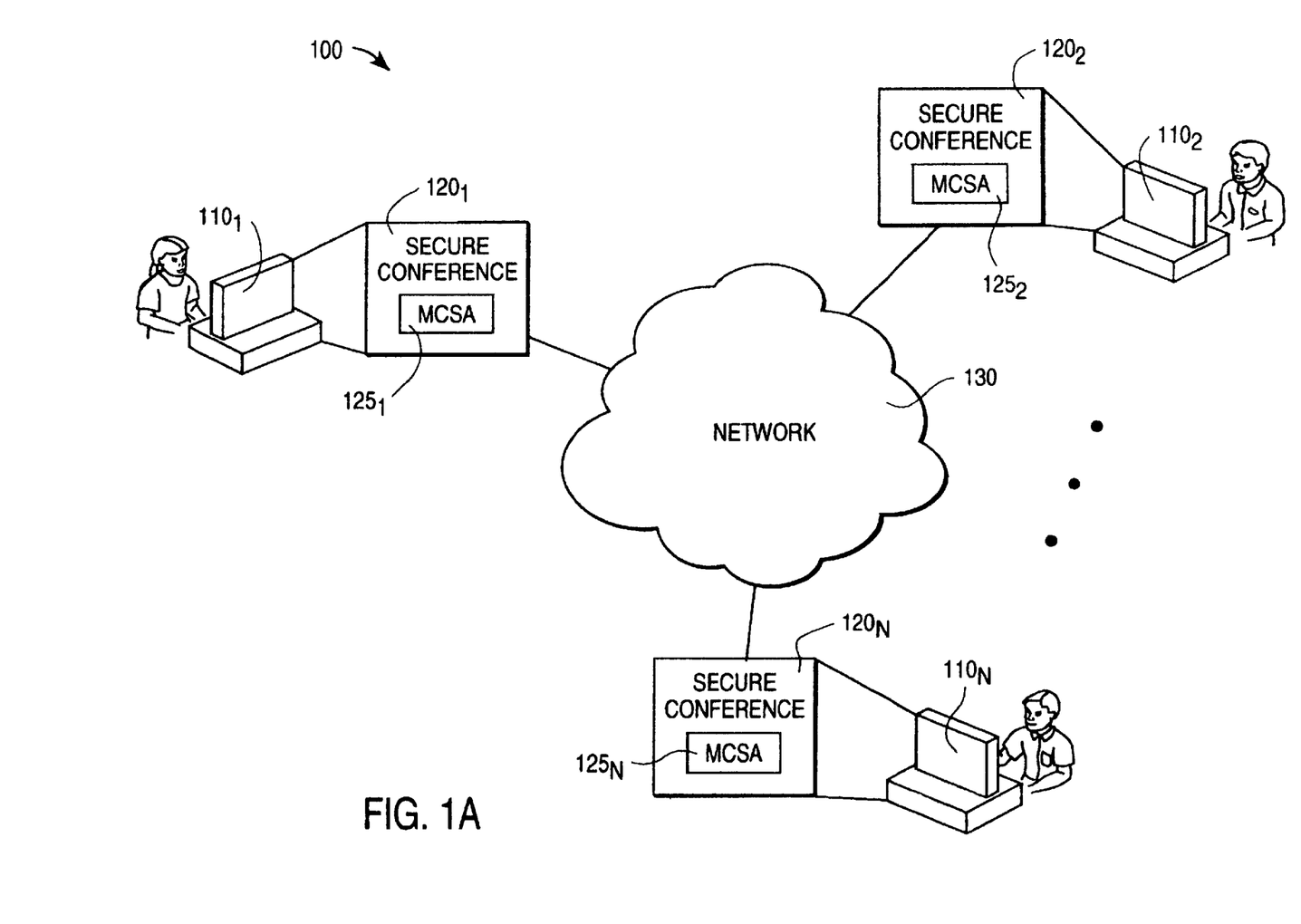
FIG. 1A is a diagram illustrating a network system in which one embodiment of the invention can be practiced.

FIG. 1A is a diagram illustrating a network system 100 in which one embodiment of the invention can be practiced. Network system 100 includes N users $110_1$ to $110_N$ and a network 130, which is a network medium that provides linking or connectivity among the N users $110_1$ to $110_N$. For example, network 130 may be a public internet or an intranet.

Each of the N users $110_1$–$110_N$ includes a computer system having an executable application to allow members of the session to communicate in a group activity. This group activity may be a meeting, a conference, or a discussion. Each of the N users $110_j$ ("j" ranging between 1 and N inclusive) has a secure conference $120_j$ which provides the necessary environment, platform, and protocols for the group activity. The secure conference $120_j$ has a multicast conference secure architecture (MCSA) $125_j$. The MCSA $125_j$ acts as an intermediary between the application layer and the network layer at each user platform to provide an efficient and flexible secure session.

Figure 1B:
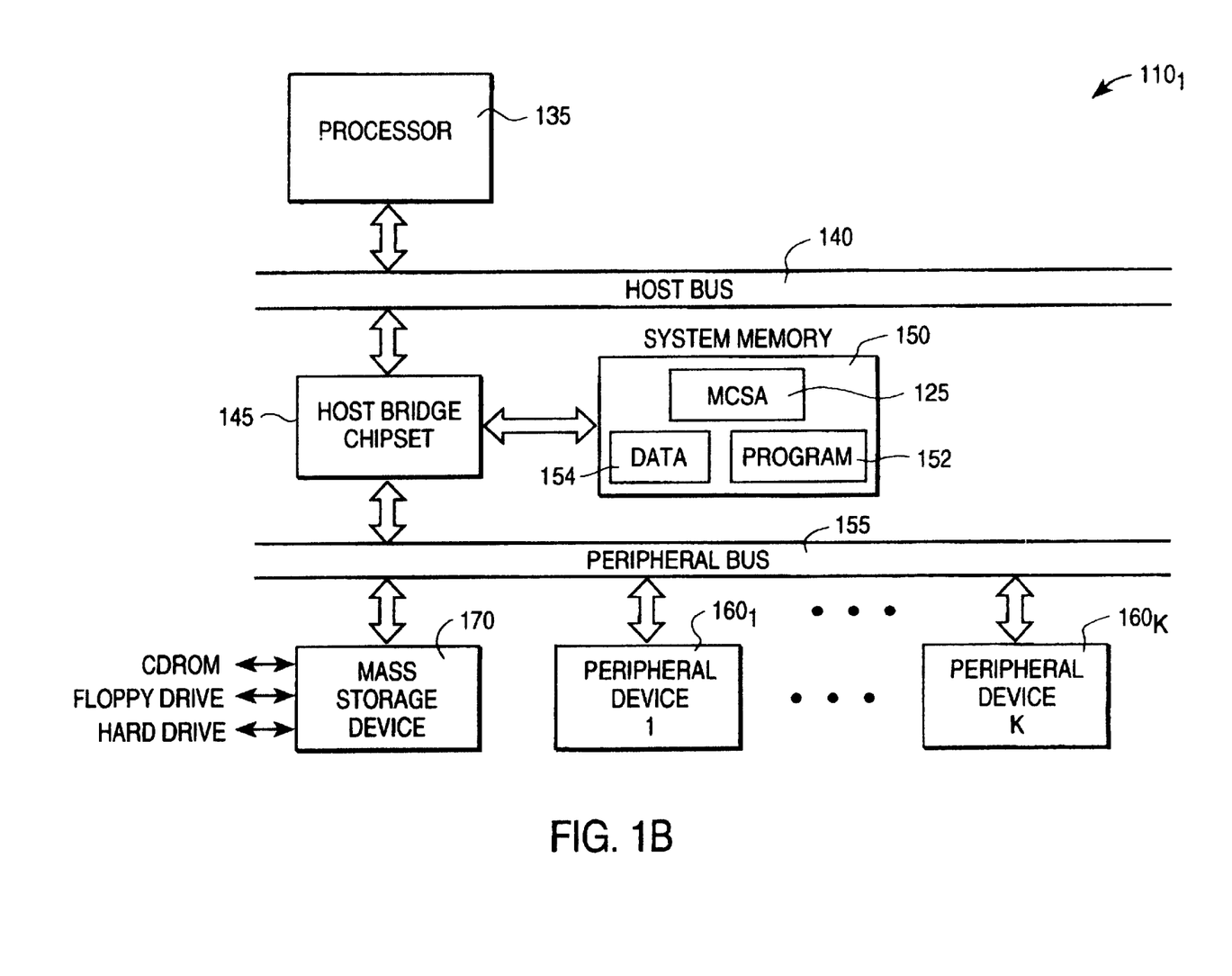
FIG. 1B is a diagram illustrating a computer system in which one embodiment of the invention can be practiced.

FIG. 1B is a diagram illustrating a computer system employed by a user (e.g., $110_1$ of FIG. 1A) in which one embodiment of the invention can be practiced. Computer system 110, includes a processor 135, a host bus 140, a host bridge chipset 145, a system memory 150, a peripheral bus 155, K peripheral devices $160_1$ to $160_K$ ("K" being a positive whole number) and a mass storage device 170 such as any type of disk drive (e.g., compact disk, floppy disk, hard drive, digital video, etc.).

The processor 135 represents a central processing unit of any type of architecture, such as complex instruction set computers (CISC), reduced instruction set computers (RISC), very long instruction word (VLIW), or hybrid architecture. The invention could be implemented in a multi-processor or single processor computer system.

The host bridge chipset 145 includes a number of interface circuits to allow the host processor 135 access to the system memory 150, and the peripheral bus 155. The system memory 150 represents one or more mechanisms for storing information. For example, the system memory 150 may include non-volatile or volatile memories. Examples of these memories include flash memory, read only memory (ROM), or random access memory (RAM). The system memory 150 includes a multicast conference secure architecture (MCSA) program $125_1$, a program 152, and data 154. The program 152 may include one or more multicast or conference applications. The data 154 may contain one or more databases such as conference keys, secure association database, and others. Of course, the system memory 150 may also contain additional software (not shown), which is not necessary to understanding the invention.

When inserted into designated peripheral slots, peripheral devices $160_1$–$160_K$ are coupled to host bridge chipset 145 via peripheral bus 155. Examples of peripheral devices $160_1$–$160_K$ include a network interface and a media interface. A "network interface" acts as a coupling mechanism to a communication channel such as the Internet. The Internet provides access to on-line service providers, Web browsers, and other network channels. A "media interface" provides access to audio and video devices.

When implemented in software, the elements of the present invention are essentially the code segments to perform the necessary tasks. The program or code segments can be stored in a processor readable medium or transmitted over a transmission medium through signaling such as a digital stream of bits or a modulated signal. The "processor readable medium" may include any medium that can store or transfer information. Examples of the processor readable medium include an electronic circuit, a semiconductor memory device, a read only memory (ROM), a flash memory, any type of erasable ROM (e.g., EROM), a floppy diskette, a compact disk, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
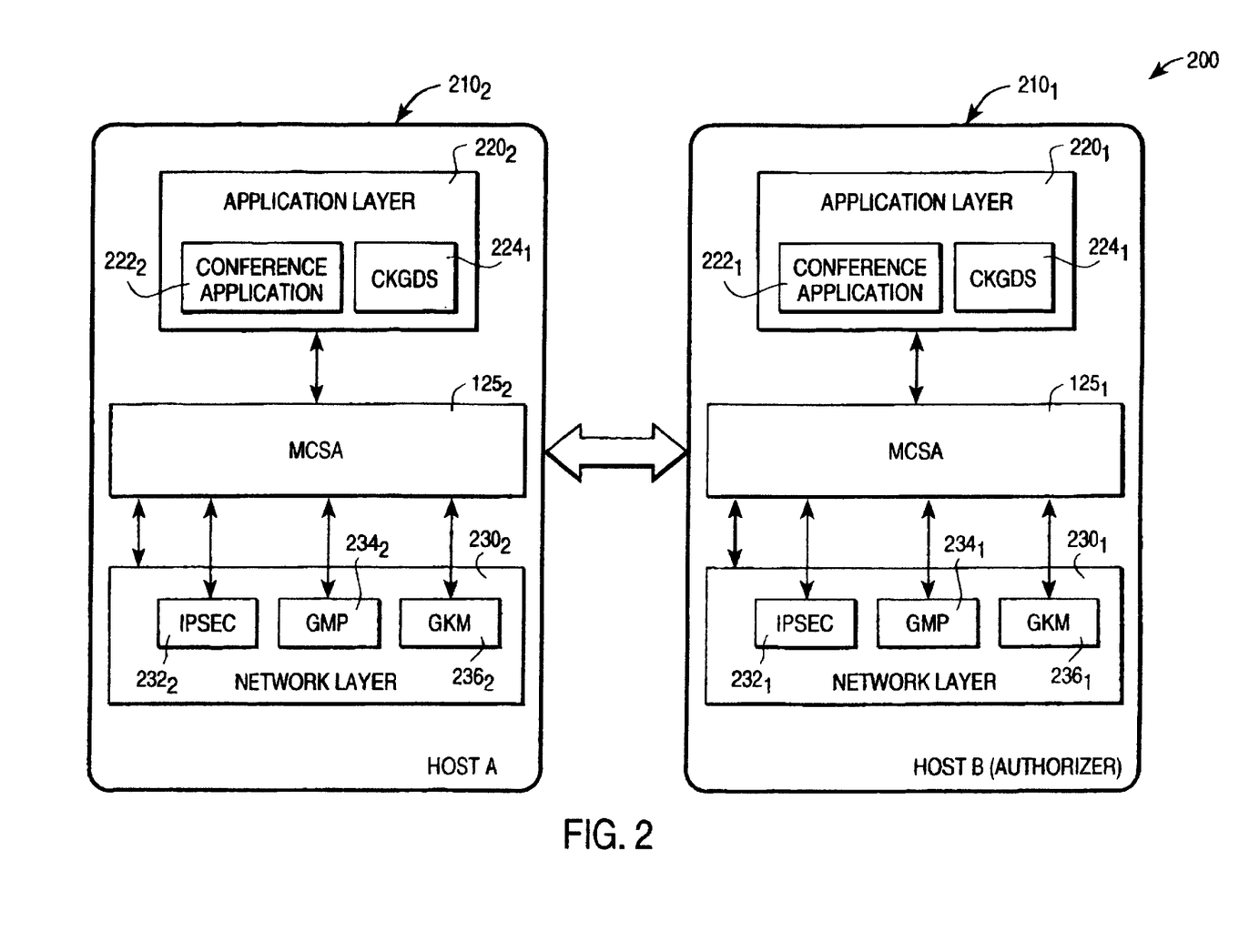
FIG. 2 is a diagram illustrating a secure conference environment according to one embodiment of the invention.

FIG. 2 is a diagram illustrating a secure conference environment 200 according to one embodiment of the invention. Secure conference environment 200 includes users $210_1$ and $210_2$. Herein, in this embodiment, user $210_1$, acts as an authorizer of a session. User $210_1$ includes an application layer $220_2$, a multicast conference secure architecture (MCSA) $125_1$ and a network layer $230_1$. User $210_2$ is a host acting as a member in the session. User $210_2$ includes an application layer $220_2$, a multicast conference secure architecture (MCSA) $125_2$ and a network layer $230_2$. In general, the elements of the users $210_1$ and $210_2$ are essentially the same. The user $210_1$, however, is typically a trusted agent in the session and is typically certified by a trusted certification authority (e.g., bank, particular company, governmental entity, an original equipment manufacturer "OEM", a software vendor, a trade association, or any other trusted person or entity).

For clarity, in the following discussion of FIG. 2, the subscripts have been dropped. In the context of a secure group activity or session, while application layer 220 is oriented toward an individual user, network layer 230 is oriented toward the group of the users.

Referring still to FIG. 2, application layer 220 includes a conference application 222 and a conference key generation and distribution system (CKGDS) 224. Conference application 222 provides the conference instances at the application level. CKGDS 224 generates and distributes the conference keys to members participating in the session.

Network layer 230 provides interface, control, and management of the session at the network level. These tasks include encryption and decryption of messages or traffic coming into or out of the network, maintenance of the network protocol, and management of the group keys. Network layer 230 includes a network security 232, a group management protocol (GMP) 234, and a group key manager (GKM) 236. Network security 232 provides network level protection to the network traffic. In one embodiment, the network is the Internet and network security 232 is code associated with Internet Protocol Security Protocol (IPSEC). GMP 234 provides the protocols for the management of the group keys to be used in the session. GKM 236 manages the group key generation and distribution. In one embodiment, GKM 236 distributes keys to all hosts of a multicast session. Each group is assigned a unique group key, and all traffic within the group is encrypted using the group key.

MCSA 125 is at the session layer and provides a mechanism to assure an efficient and flexible session. MCSA 125 acts as an interface between application layer 220 and network layer 230. MCSA 125 acts as an intermediary between the conference application program at application layer 220 and the multicast-related protocols (host-side or client-side) at network layer 230.

The authorizer (e.g., host B $210_1$ of FIG. 2) is typically a central point which authorizes and distribute keys for the group as provided by the GKM protocol. The authorizer may or may not be a member or participant in the session itself. The authorizer entity can be a router, a server, or other devices that are capable of authorizing the group keys.

In order to participate in the group activity or session, the authorizer entity typically contains the elements of MCSA 125 so that peer-level interaction is possible. In one embodiment, the authorizer runs the GKM protocol to establish group keys and perform high-level tasks, including certificate management, user access control, policy implementation, and others. The authorizer within a subnet can in fact be a subnet of the policy hierarchy governing the entire autonomous system.

The authorizer generates group keys which are used by the group members to encrypt the payload within the multicast packets of a given group. In one embodiment, each group has a secret (e.g., symmetric) key which is obtained by each member host through a security association (SA) with the authorizer. Each member host impliedly has a distinguished name and has a certificate before a security association is established. In one embodiment, each host is assigned a distinguished name and a certificate by the certification authority.

MCSA 125 facilitates the use of a secured multicast at network layer 230 for establishing a secured conference at application layer 220. MCSA 125 introduces components at the session layer that coordinate, among others, the creation of multicast groups, the obtaining of group keys for the group, and the mapping of the conference instance to the multicast instance. MCSA 125 also provides protocol independence in that different secure conferencing schemes at application layer 220 can be used independently of the multicast protocol and group key management protocol at network layer 230.

MCSA 125 and its associated routing structures allow a host who is part of a group to also transmit messages to the group. This can be achieved by using a multicast protocol that allows a receiver-host to also transmit messages to the group. Thus, in effect the underlying multicast protocol performs an N-to-N multicast where "N" is the number of users or applications.

Figure 3:
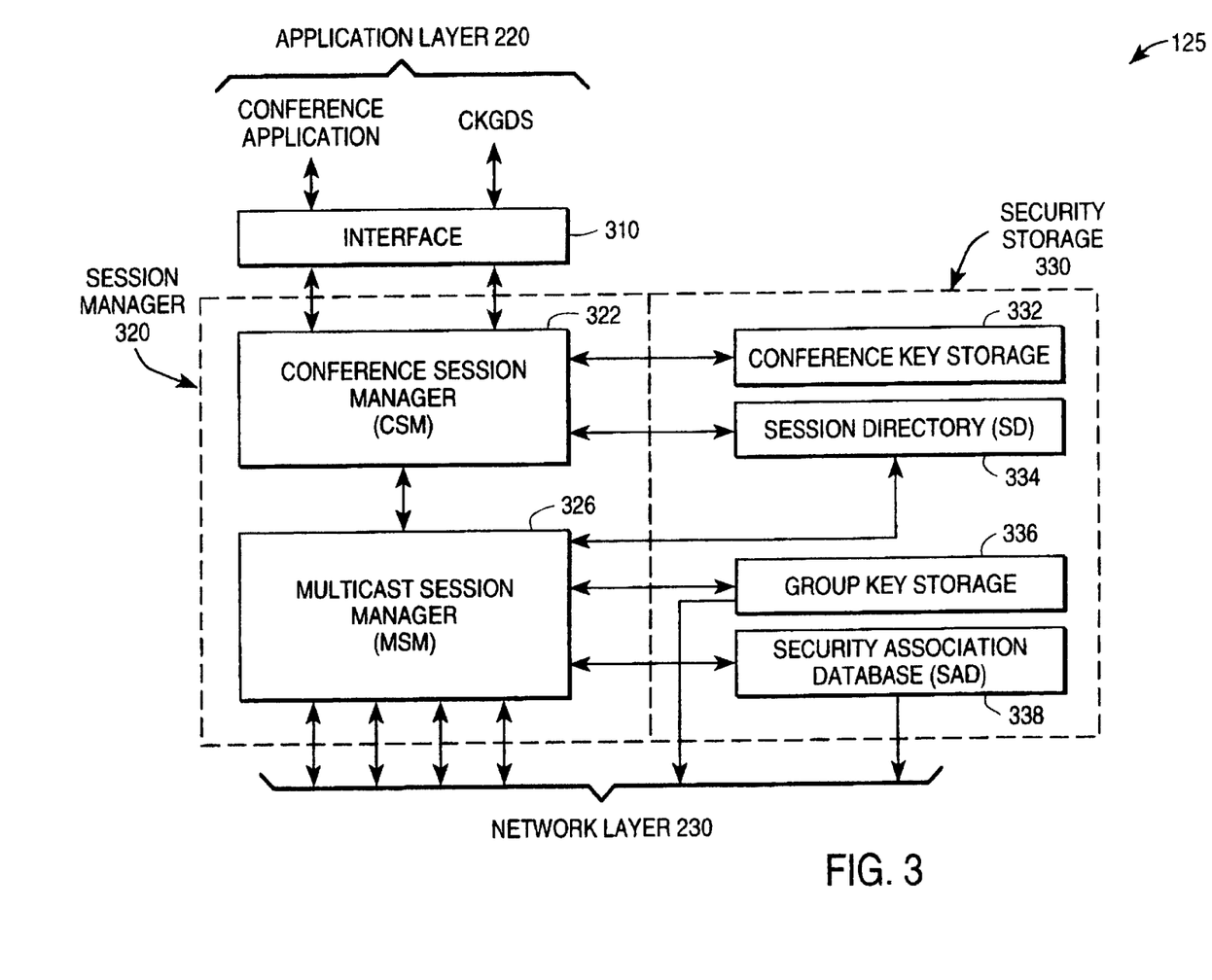
FIG. 3 is a diagram illustrating a MCSA according to one embodiment of the invention.

FIG. 3 is a diagram illustrating an embodiment of MCSA 125 in accordance with the present invention. MCSA 125 includes a session manager 320, a security storage 330, and an interface 310.

As shown, session manager 320 manages the session. Session manager 320 includes a conference session manager (CSM) 322 and a multicast session manager (MSM) 326. CSM 322 is oriented toward the application layer while MSM 326 is oriented toward the network layer. CSM 322 and MSM 326 interact with each other to provide a correspondence between a conference instance at the application level and a multicast instance at the network level.

Security storage 330 provides security components to be used in the session. These security components include conference keys, a session directory, group keys, and security associations. In particular, security storage 330 includes a conference key storage 332, a session directory (SD) 334, a group key storage 336, and a security association database (SAD) 338.

Conference key storage 332 stores the conference keys as generated and distributed by the CKGDS at the corresponding application layer. Session directory 334 contains a directory or directories of the session. The directory includes the member information and other information. Session directory 334 is accessible to both CSM 322 and MSM 326. Group key storage 336 stores the group keys as generated and distributed by GKM at the network layer. Group key storage 336 is interfaced with MSM 326 and the network layer (e.g., the GKM). SAD 338 contains the security associations by the member host with the authorizer. SAD 338 is interfaced with MSM 326 and the network layer (e.g., the IPSEC and GKM).

Interface 310 provides an interface to application layer 220. Interface 310 may be an application programmable interface (API). Such an API is usable with a variety of CKGDS's and may be extendable to other applications that exhibit conference-like behaviors and security requirements.

In a session, at the conference level, the user or application initiating the session is the coordinator of the session and the contact-point for other users wishing to join or leave the session. The coordinator is also responsible for ejecting a session member. MCSA 125 can be either an "initiator MCSA" or a "receiver-sender MCSA". Correspondingly, the session manager in the MCSA can be either an initiator session manager or a receiver-sender session manager.

Figure 4:
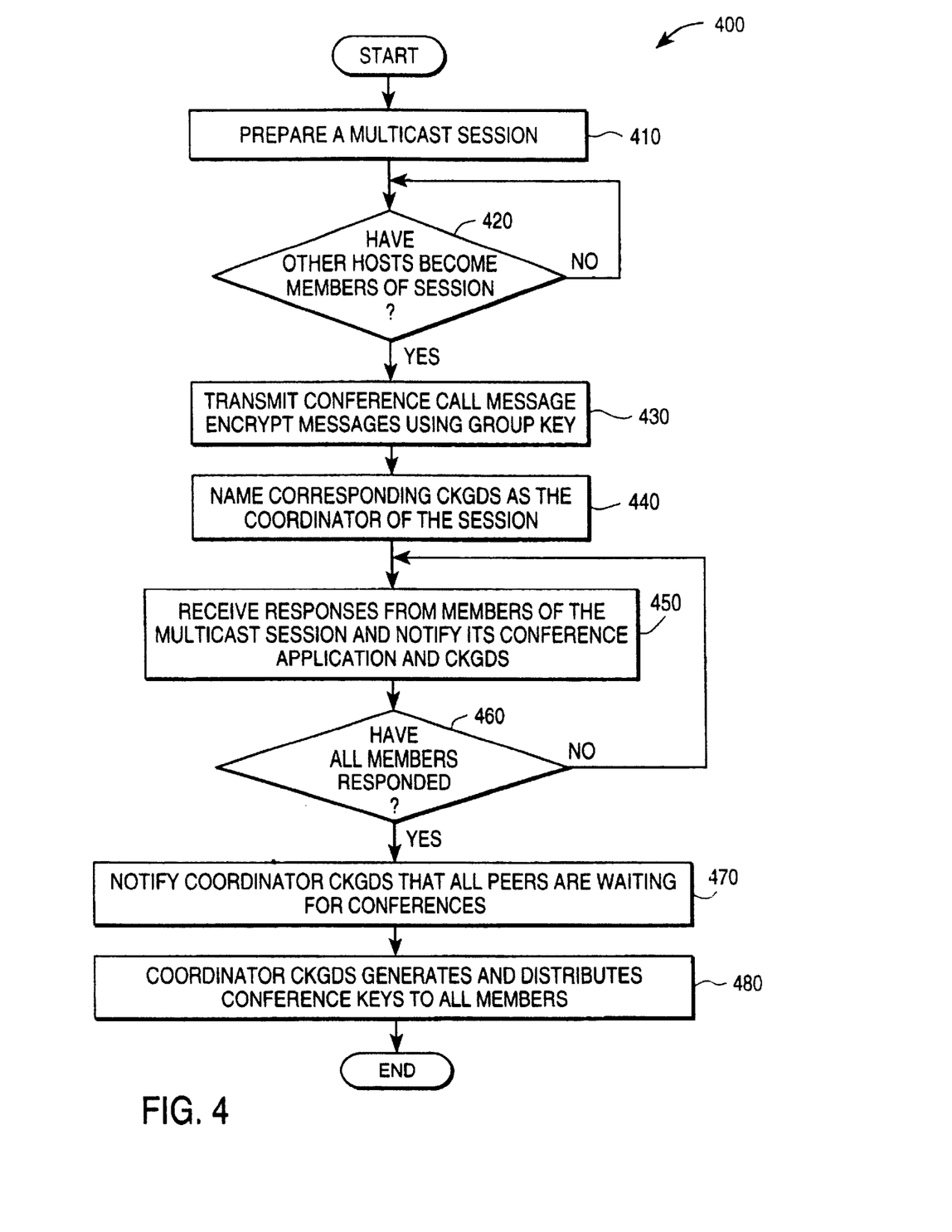
FIG. 4 is a flowchart illustrating a process to initiate a session by an initiator session manager according to one embodiment of the invention.

FIG. 4 is a flowchart illustrating a process 400 to initiate a session by an initiator session manager according to one embodiment of the invention Initially, the process 400 prepares a multicast session (Block 410). The details of the preparation will be explained in FIG. 5. Then the process 400 determines if other hosts have become the members of the multicast session (Block 420). If not, the process 400 conducts another subsequent determination at a later period of time until all hosts have become members of the session. If all hosts have become members, the process 400 transmits a conference-call message through the multicast session, with the announcement details being encrypted using the group key (Block 430). Then the process 400 names the corresponding CKGDS as the coordinator of the session (Block 440). The corresponding CKGDS is the CKGDS residing in the application layer that is interfaced with the initiator MCAS.

Next, the process 400 receives responses from the members of the multicast session replying to the conference-call message. The process 400 notifies the corresponding conference application and the CKGDS at the application layer about the group members that request to join in the session (Block 450). The process 400 determines if all members have responded (Block 460). If not, the process 400 returns to Block 450. When all members have responded, the process 400 notifies the corresponding CKGDS that all peer MCSA's are waiting for the conference key generation and distribution to commence (Block 470).

The coordinator CKGDS then generates and distributes the conference keys to all members (Block 480). Each application then has a copy of the conference key. All traffic during and after the conference key generation and distribution are encrypted at the network layer using the multicast group key. Then the process 400 is terminated.

Figure 5:
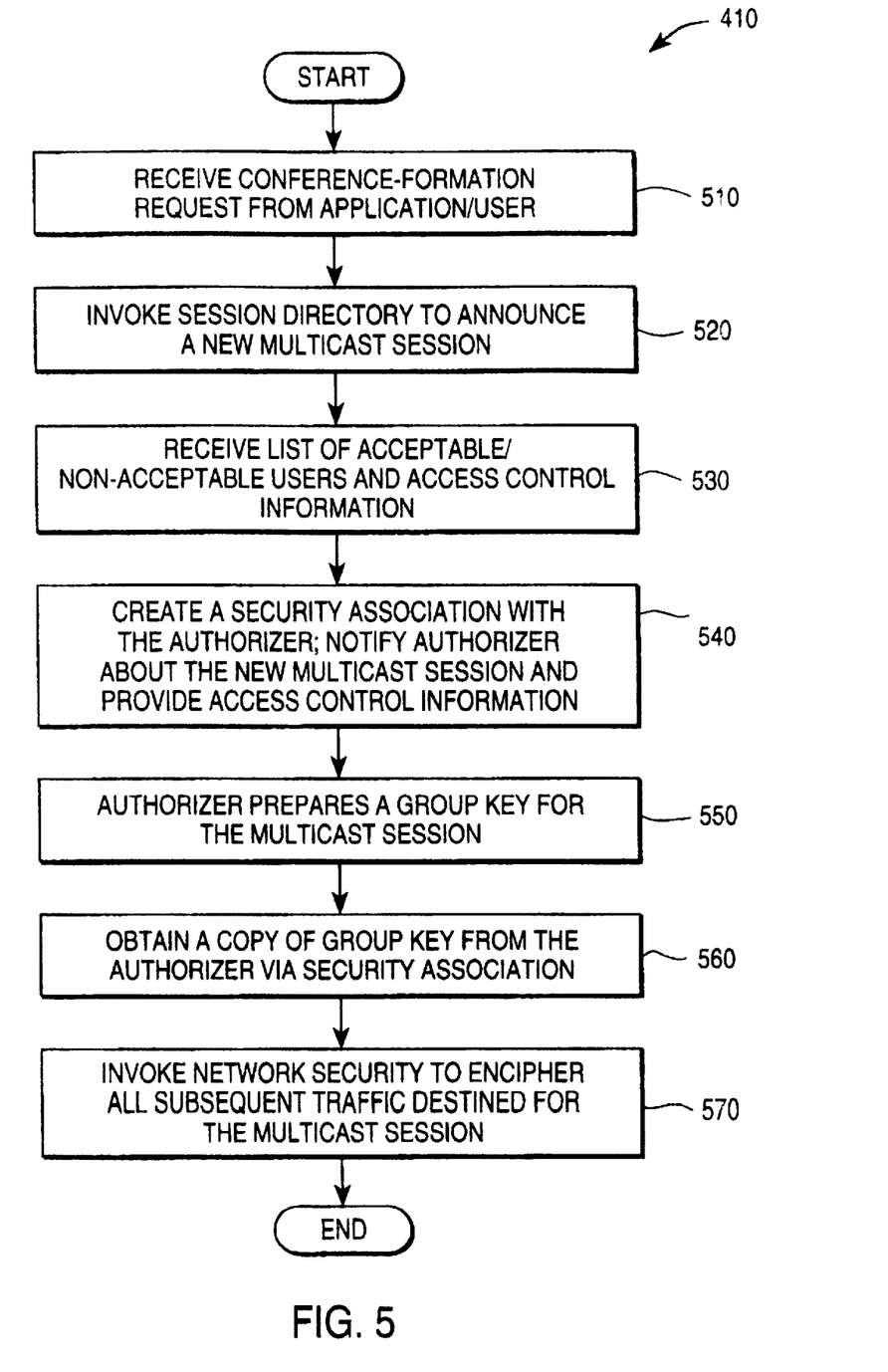
FIG. 5 is a flowchart illustrating a process to prepare a multicast session by an initiator session manager according to one embodiment of the invention.

FIG. 5 is a flowchart illustrating a process 410 to prepare a multicast session by the initiator session manager according to one embodiment of the invention. This "process" describes the operations of software, hardware or a combination of both hardware and software associated with the initiator session manager.

More specifically, the process 410 receives a conference-formation request from the application or user (Block 510). The process 410 then invokes the session directory to announce a new multicast session (Block 520). The announcement includes the identity of the authorizer from which other hosts can obtain the group key. The announcement also indicates that the multicast session will be part of a session or group activity soon to be created. Then the process 410 receives a list of acceptable and optionally non-acceptable users and the associated access control information from the requesting application or user (Block 530).

Then the process 410 creates a security association with the authorizer, notifies the authorizer about the new multicast session, and provides the authorizer with the access control information for access at the user level and the host level (Block 540). Upon receiving this information, the authorizer prepares a group key for the multicast session (Block 550). Then the process 410 uses the security association to obtain a copy of the group key (Block 560). Next, the process 410 invokes the network security to encipher all subsequent traffic destined for the multicast session (Block 570). The process 410 is then terminated.

Figure 6:
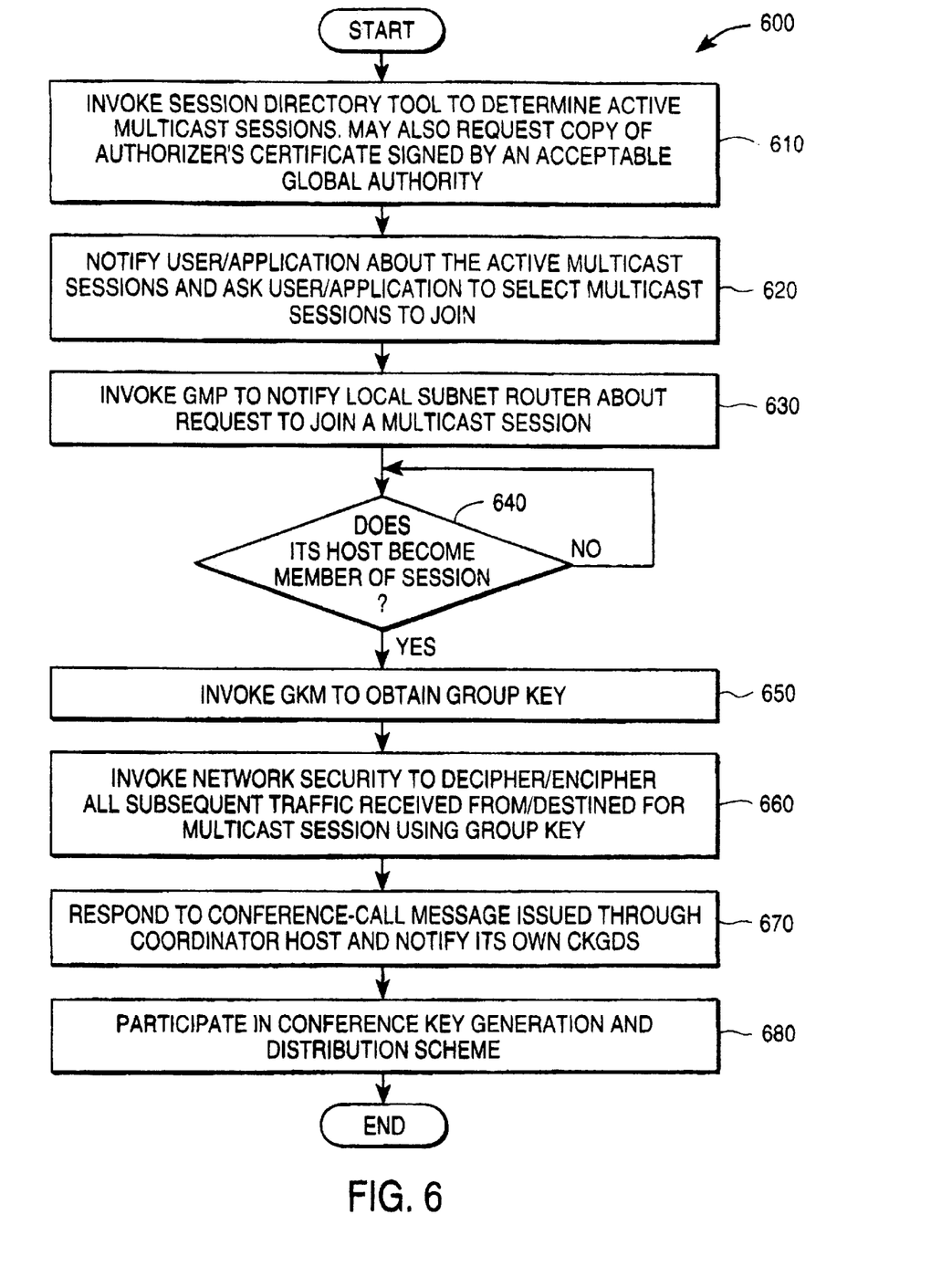
FIG. 6 is a flowchart illustrating a process by a receiver/sender session manager to participate in a session according to one embodiment of the invention.

FIG. 6 is a flowchart illustrating a process 600 by a receiver/sender session manager to participate in a session according to one embodiment of the invention. This "process" describes the operations of software, hardware or a combination of both hardware and software associated with the receiver/sender session manager.

Initially, the process 600 invokes the session directory tool to determine the active multicast sessions such as the start time, duration, IP address, and formats. The user may also request the authorizer to provide a copy of the authorizer's certificate signed by an acceptable certification authority to prevent masquerading (Block 610). The process 600 notifies the application or user about the active multicast sessions and asks the application or user to select the multicast sessions to join (Block 620). Then the process 600 invokes the GMP to notify the local subnet router about the request to join in a particular multicast session(s) which comprise the session or group activity (Block 630).

The process 600 then determines if the host becomes a member of the session (Block 640). If not, the process 600 conducts a subsequent determination at a later time to check whether the host has become a member. If the host becomes a member, the process 600 invokes the GKM to obtain the group key (Block 650). One way to obtain the group key is to create a security association with the authorizer and then use the resulting secured channel to download a copy of the key.

Next, the process 600 invokes the network security to decipher and/or encipher all subsequent traffic received from or destined for the multicast session using the group key (Block 660). Then the process 600 responds to the conference-call message issued through the coordinator host and notifies the corresponding CKGDS of the ready status of the coordinator CKGDS (Block 670). The corresponding CKGDS is the CKGDS in the application layer that is interfaced to the receiver-sender MCSA. Then, after some session parameter negotiations, the CKGDS participates in the conference key generation and distribution scheme (Block 680). The process 600 is then terminated.

Note that the conference application can employ its own mechanism for confidentiality and authentication at the application layer. This approach may be preferable in certain circumstances where the security requirements are more stringent.

In the MCSA, the group key at the host level only affords group authentication. If sender authentication at the network layer is also required in order to identify the source-host, then each member-host embeds its signature as part of the payload.

Thus, the present invention is a technique to secure a session or group activity in a network environment. A multicast conference secure architecture acts as an intermediary between the application layer and the network layer to manage the session via a multicast session and a conference session. Group keys are generated and distributed at the network layer while conference keys are generated and distributed at the application layer. The technique provides an efficient and flexible mechanism to manage a conference among users in a group.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method to secure a conference session for a plurality of users having application and network layers, the method comprising:
    managing the conference session by a session manager at each of the users;
    coordinating, by the session manager, a mapping of the conference session at the application layer to a multicast session at the network layer using the security components; and
    providing security components used in the conference and multicast sessions by a security storage at each of the users.

2. The method of claim 1 wherein the security components include conference keys, a group key, and a security association.

3. The method of claim 2 wherein the session manager is one of an initiator session manager and a receiver-sender session manager, the initiator session manager initiating the conference session, the receiver-sender session manager receiving and sending messages in the conference session.

4. The method of claim 2 wherein the network layer includes a network security, a group management protocol (GMP), and a group key manager (GKM), the GKM generating the group key.

5. The method of claim 4 wherein the application layer includes a conference application and a conference key generation and distribution system (CKGDS), the CKGDS generating and distributing the conference keys.

6. The method of claim 5 wherein managing the conference session comprises:
    maintaining conference information of the conference session by a conference session manager (CSM); and
    maintaining a correspondence between a conference instance and a multicast instance by a multicast session manager (MSM).

7. The method of claim 6 wherein providing the security components comprises:
    storing session information in a session directory (SD);
    storing the conference keys in a conference key storage;
    storing the group key in a group key storage; and
    storing a security association used in the multicast session in a security association database (SAD).

8. The method of claim 7 further comprising:
    generating an announcement of the multicast session upon request by a user of the conference session by invoking the SD by the session manager, the announcement including an identity of an authorizer.

9. The method of claim 8 further comprising:
    creating the security association with the authorizer by the initiator session manager, the authorizer generating the group key for the multicast session.

10. The method of claim 9 further comprising:
    obtaining a copy of the group key via the security association by the initiator session manager.

11. The method of claim 10 further comprising:
    invoking the network security to encipher subsequent network messages in the multicast session by the initiator session manager.

12. The method of claim 11 further comprising:
    transmitting a conference call message through the multicast session, the conference call message being encrypted using the group key by the initiator session manager.

13. The method of claim 12 further comprising:
    notifying the conference application and the CKGDS about members that request to join the conference session by the initiator session manager.

14. The method of claim 13 further comprising:
    generating and distributing the conference keys to the members by the CKGDS corresponding to the initiator session manager, the conference keys being encrypted using the group key.

15. The method of claim 7 further comprising:
    obtaining an announcement of the multicast session upon request by a user of the conference session by invoking the SD by the receiver-sender session manager, the announcement including an identity of an authorizer.

16. The method of claim 15 further comprising:
    requesting the authorizer with a copy of a certificate authenticating the authorizer by the receiver-sender session manager.

17. The method of claim 16 further comprising:
    notifying the user about the multicast session and requests to user to join the multicast session by the receiver-sender session manager.

18. The method of claim 17 further comprising:
obtaining the group key via the GKM by the receiver-sender session manager.

19. The method of claim 18 further comprising:
creating the security association with the authorizer and downloading a copy of the group key using the security association.

20. The method of claim 18 further comprising:
invoking the network security to decipher and encipher subsequent network messages in the multicast session using the group key by the receiver-sender session manager.

21. The method of claim 19 further comprising:
responding to a conference-call message by the receiver-sender session manager, the conference-call message being issued by the initiator session manager.

22. The method of claim 20 further comprising:
participating in a conference key generation and distribution scheme by the CKGDS corresponding to the receiver-sender session manager, the conference key generation and distribution scheme being managed by the CKGDS corresponding to the initiator session manager.

23. An apparatus to secure a conference session for a plurality of users having application and network layers, the apparatus comprising:
a session manager at each of the users coupled to the application and network layers to manage the conference session and coordinate a mapping of the conference session at the application layer to a multicast session at the network layer using security components; and
a security storage at each of the users coupled to the session manager and the network layer to provide the security components used in the conference and multicast sessions.

24. The apparatus of claim 23 wherein the security components include conference keys, a group key, and a security association.

25. The apparatus of claim 24 wherein the session manager is one of an initiator session manager and a receiver-sender session manager, the initiator session manager initiating the conference session, the receiver-sender session manager receiving and sending messages in the conference session.

26. The apparatus of claim 25 wherein the network layer includes a network security, a group management protocol (GMP), and a group key manager (GKM), the GKM generating the group key.

27. The apparatus of claim 26 wherein the application layer includes a conference application and a conference key generation and distribution system (CKGDS), the CKGDS generating and distributing the conference keys.

28. The apparatus of claim 27 wherein the session manager comprises:
a conference session manager (CSM) coupled to the application layer to maintain conference information of the conference session; and
a multicast session manager (MSM) coupled to the conference session manager and the network layer to maintain a correspondence between a conference instance and a multicast instance.

29. The apparatus of claim 28 wherein the security storage comprises:
a session directory (SD) coupled to the CSM and the MSM to store session information;
a conference key storage coupled to the CSM to store the conference keys;
a group key storage coupled to the MSM and the network layer to store the group key; and
a security association database (SAD) coupled to the MSM and the network layer to store a security association used in the multicast session.

30. The apparatus of claim 29 wherein the initiator session manager generates an announcement of the multicast conference session upon request by a user of the session, the session manager invoking the SD, the announcement including an identity of an authorizer.

31. The apparatus of claim 30 wherein the initiator session manager creates the security association with the authorizer, the authorizer generating the group key for the multicast session.

32. The apparatus of claim 30 wherein the initiator session manager obtains a copy of the group key via the security association.

33. The apparatus of claim 32 wherein the initiator session manager invokes network security to encipher subsequent network messages in the multicast session.

34. The apparatus of claim 33 wherein the initiator session manager transmits a conference call message through the multicast session, the conference call message being encrypted using the group key.

35. The apparatus of claim 34 wherein the initiator session manager notifies the conference application and the CKGDS about members that request to join the conference session.

36. The apparatus of claim 35 wherein the CKGDS corresponding to the initiator session manager generates and distributes conference keys to the members, the conference keys being encrypted using the group key.

37. The apparatus of claim 29 wherein the receiver-sender session manager obtains an announcement of the multicast session upon request by a user of the conference session by invoking the SD, the announcement including an identity of an authorizer.

38. The apparatus of claim 37 wherein the receiver-sender session manager requests the authorizer with a copy of a certificate authenticating the authorizer.

39. The apparatus of claim 38 wherein the receiver-sender session manager notifies the user about the multicast session and requests the user to join the multicast session.

40. The apparatus of claim 39 wherein the receiver-sender session manager obtains the group key via the GKM.

41. The apparatus of claim 40 wherein the receiver-sender session manager obtains the group key by creating the security association with the authorizer and downloading a copy of the group key using the security association.

42. The apparatus of claim 40 wherein the receiver-sender session manager invokes the network security to decipher and encipher subsequent network messages in the multicast session using the group key.

43. The apparatus of claim 41 wherein the receiver-sender session manager responds to a conference-call message issued by the initiator session manager.

44. The apparatus of claim 42 wherein the CKGDS corresponding to the receiver-sender session manager participates in a conference key generation and distribution scheme by the CKGDS corresponding to the initiator session manager.

45. A system comprising:
a plurality of users each having an application layer and network layer; and
a multicast conferencing security architecture (MCSA) coupled to the application and network layers to secure a conference session, the MCSA comprising:
a session manager coupled to the application and network layers to manage the conference session and coordinate a mapping of the conference session at the application layer to a multicast session at the network layer using security components; and a security storage coupled to the session manager and the network layer to provide the security components used in the conference and multicasts sessions.

46. The system of claim 45 wherein the security components include conference keys, a group key, and a security association.

47. The system of claim 46 wherein the session manager is one of an initiator session manager and a receiver-sender session manager.

48. The system of claim 47 wherein the network layer includes a network security, a group management protocol (GMP), and a group key manager (GKM), the GKM generating the group key.

49. The system of claim 48 wherein the application layer includes a conference application and a conference key generation and distribution system (CKGDS), the CKGDS generating and distributing the conference keys.

50. The system of claim 49 wherein the session manager comprises:
a conference session manager (CSM) coupled to the application layer to maintain conference information of the conference session; and
a multicast session manager (MSM) coupled to the conference session manager and the network layer to maintain a correspondence between a conference instance and a multicast instance.

51. The system of claim 50 wherein the security storage comprises:
a session directory (SD) coupled to the CSM and the MSM to store session information;
a conference key storage coupled to the CSM to store the conference keys;
a group key storage coupled to the MSM and the network layer to store the group key; and
a security association database (SAD) coupled to the MSM and the network layer to store a security association used in the multicast session.

52. The system of claim 51 wherein the initiator session manager generates an announcement of the multicast session upon request by a user of the conference session by invoking the SD, the announcement including an identity of an authorizer.

53. The system of claim 52 wherein the initiator session manager creates the security association with the authorizer, the authorizer generating the group key for the multicast session.

54. The system of claim 52 wherein the initiator session manager obtains a copy of the group key via the security association.

55. The system of claim 54 wherein the initiator session manager invokes network security to encipher subsequent network messages in the multicast session.

56. The system of claim 55 wherein the initiator session manager transmits a conference call message through the multicast session, the conference call message being encrypted using the group key.

57. The system of claim 56 wherein the initiator session manager notifies the conference application and the CKGDS about members that request to join the conference session.

58. The system of claim 57 wherein the CKGDS corresponding to the initiator session manager generates and distributes conference keys to the members, the conference keys being encrypted using the group key.

59. The system of claim 51 wherein the receiver-sender session manager obtains an announcement of the multicast session upon request by a user of the conference session by invoking the SD, the announcement including an identity of an authorizer.

60. The system of claim 59 wherein the receiver-sender session manager requests the authorizer with a copy of a certificate authenticating the authorizer.

61. The system of claim 60 wherein the receiver-sender session manager notifies the user about the multicast session and requests the user to join the multicast session.

62. The system of claim 61 wherein the receiver-sender session manager obtains the group key via the GKM.

63. The system of claim 62 wherein the receiver-sender session manager obtains the group key by creating the security association with the authorizer and downloading a copy of the group key using the security association.

64. The system of claim 62 wherein the receiver-sender session manager invokes the network security to decipher and encipher subsequent network messages in the multicast session using the group key.

65. The system of claim 63 wherein the receiver-sender session manager responds to a conference-call message issued by the initiator session manager.

66. The system of claim 65 wherein the CKGDS corresponding to the receiver-sender session manager participates in a conference key generation and distribution scheme by the CKGDS corresponding to the initiator session manager.

67. A computer program product comprising:
a computer usable medium having computer program code embodied therein to secure a conference session for a plurality of users having application and network layers, the computer program product having:
computer readable program code for managing the conference session by a session manager at each of the users;
computer readable program code for coordinating, by the session manager, a mapping of the conference session at the application layer to a multicast session at the network layer using the security components; and
computer readable program code for providing security components used in the conference and multicast sessions by a security storage at each of the users.

68. The computer program product of claim 67 wherein the security components include conference keys, a group key, and a security association.

69. The computer program product of claim 68 wherein the session manager is one of an initiator session manager and a receiver-sender session manager, the initiator session manager initiating the conference session, the receiver-sender session manager receiving and sending messages in the conference session.

70. The computer program product of claim 69 wherein the network layer includes a network security, a group management protocol (GMP), and a group key manager (GKM), the GKM generating the group key.

71. The computer program product of claim 70 wherein the application layer includes a conference application and a conference key generation and distribution system (CKGDS), the CKGDS generating and distributing the conference keys.

72. The computer program product of claim 71 wherein the computer readable program code for managing the session comprises:
computer readable program code for maintaining conference information of the session by a conference session manager (CSM); and
computer readable program code for maintaining a correspondence between a conference instance and a multicast instance by a multicast session manager (MSM).

73. The computer program product of claim 72 wherein the computer readable program code for providing the security components comprises:
computer readable program code for storing session information in a session directory (SD);
computer readable program code for storing the conference keys in a conference key storage;

computer readable program code for storing the group key in a group key storage; and computer readable program code for storing a security association used in the multicast session in a security association database (SAD).

74. The computer program product of claim 73 further comprising:

computer readable program code for generating an announcement of the multicast session upon request by a user of the conference session by invoking the SD by the session manager, the announcement including an identity of an authorizer.

75. The computer program product of claim 74 further comprising:

computer readable program code for creating the security association with the authorizer by the initiator session manager, the authorizer generating the group key for the multicast session.

76. The computer program product of claim 75 further comprising:

computer readable program code for obtaining a copy of the group key via the security association by the initiator session manager.

77. The computer program product of claim 76 further comprising:

computer readable program code for invoking the network security to encipher subsequent network messages in the multicast session by the initiator session manager.

78. The computer program product of claim 77 further comprising:

computer readable program code for transmitting a conference call message through the multicast session, the conference call message being encrypted using the group key by the initiator session manager.

79. The computer program product of claim 78 further comprising:

computer readable program code for notifying the conference application and the CKGDS about members that request to join the conference session by the initiator session manager.

80. The computer program product of claim 79 further comprising:

computer readable program code for generating and distributing the conference keys to the members by the CKGDS corresponding to the initiator session manager, the conference keys being encrypted using the group key.

81. The computer program product of claim 73 further comprising:

computer readable program code for obtaining an announcement of the multicast session upon request by a user of the conference session by invoking the SD by the receiver-sender session manager, the announcement including an identity of an authorizer.

82. The computer program product of claim 81 further comprising:

computer readable program code for requesting the authorizer with a copy of a certificate authenticating the authorizer by the receiver-sender session manager.

83. The computer program product of claim 82 further comprising:

computer readable program code for notifying the user about the multicast session and requests to user to join the multicast session by the receiver-sender session manager.

84. The computer program product of claim 83 further comprising:

computer readable program code for obtaining the group key via the GKM by the receiver-sender session manager.

85. The computer program product of claim 84 further comprising:

computer readable program code for creating the security association with the authorizer and downloading a copy of the group key using the security association.

86. The computer program product of claim 84 further comprising:

computer readable program code for invoking the network security to decipher and encipher subsequent network messages in the multicast session using the group key by the receiver-sender session manager.

87. The computer program product of claim 85 further comprising:

responding to a conference-call message by the receiver-sender session manager, the conference-call message being issued by the initiator session manager.

88. The computer program product of claim 86 further comprising:

computer readable program code for participating in a conference key generation and distribution scheme by the CKGDS corresponding to the receiver-sender session manager, the conference key generation and distribution scheme being managed by the CKGDS corresponding to the initiator session manager.

* * * * *